June 6, 1944.  A. O. BATES  2,350,667

CUTTING TOOL AND MANUFACTURE THEREOF

Filed July 2, 1940

Inventor

Alfred O. Bates

By Mason & Porter

Attorneys

Patented June 6, 1944

2,350,667

UNITED STATES PATENT OFFICE 2,350,667

CUTTING TOOL AND MANUFACTURE THEREOF

Alfred O. Bates, Cleveland Heights, Ohio, assignor, by mesne assignments, to The Parker Appliance Company, Cleveland, Ohio, a corporation of Ohio Application July 2, 1940, Serial No. 343,661

3 Claims. (Cl. 76—89.2)

This invention relates to cutting tools and more particularly to manufacture of rotary cutting tools having peripheral cutting edges. As an example of a kind of cutting tool to which the invention is applicable, reference is made to the cutting wheels embodied in a well known type of implement commonly used for cutting pipes or tubing.

In accordance with previously known methods of manufacturing cutting tools of the general class referred to, the cutter wheel has been blanked out and ground to a sharp edge, and then hardened by heat treating. Even when such cutter wheels have been made in this way from tool steel, it has not been possible to obtain in the finished product the optimum characteristics of hardness and toughness required best to suit it for use in cutting steel tubing. Wheels made in this previously known manner have been found to be satisfactory for cutting the softer metals, such as copper or aluminum alloy, but, if tempered to a hardness sufficient to cut steel without rapidly becoming dull, the cutting edge has been too brittle, resulting in its flaking and chipping.

An object of the present invention is to provide a method of manufacturing cutting tools of the general character referred to by the use of which there is imparted to the cutting edge improved properties, and particularly greater resistance to strain, shock, and wear, chipping or flaking, and, at the same time, increased hardness sufficient to withstand becoming prematurely dull.

Another object is to provide a rotary element having a peripheral cutting edge possessing improved characteristics.

In attaining these and other objects, the cutting wheel may be shaped and hardened in the usual manner heretofore known, and then treated in accordance with the invention to impart to the cutting edge the desired characteristics. In the performance of the process, a wheel is blanked to the desired shape, preferably from annealed stock. The formed blank may then be hardened by first being heated to a temperature above the critical range of the metal, whereby the grain size is reduced considerably. To prevent the grain size from returning to its original condition, which would take place if the blank were allowed to cool slowly, the blank is cooled rapidly, preferably by quenching, thus causing the metal to retain the small grain size and other properties characteristic of the high temperature condition of the metal. Although the grain in the quenched metal is considerably refined, the metal is brittle. To improve its physical properties, the metal may be drawn or tempered by being re-heated to a temperature lower than the critical range, and then cooled in any desired manner to reduce brittleness. Although drawing or tempering the metal in this manner does reduce the brittleness, it has been found that it does not reduce the brittleness sufficiently to give the cutting edge optimum characteristics for cutting steel tubing.

In accordance with the present invention, the tool, after having been prepared suitably in blank form, for example, as outlined above, is subjected to a cold working finishing. This may be accomplished by working the sides or faces of the V-shaped cutting edge in contact with a hardened die block or the like preferably having a working surface comprising the walls of a groove shaped to properly engage the tool cutting edge. It has been found that this cold working produces a breaking down or further refining of the grain which, instead of being accompanied by brittleness, as in the case of the first heating and quenching operation, is accompanied by a change in its physical properties increasing the strength and toughness of the cutting edge, thus rendering the cutting wheel entirely suitable for cutting hard material. The making of many cutting wheels in accordance with the present invention has demonstrated clearly the superior characteristics imparted to the wheel by a process including the cold working of the cutting edge after the tool has been suitably made and treated in blank form.

Figure 1:
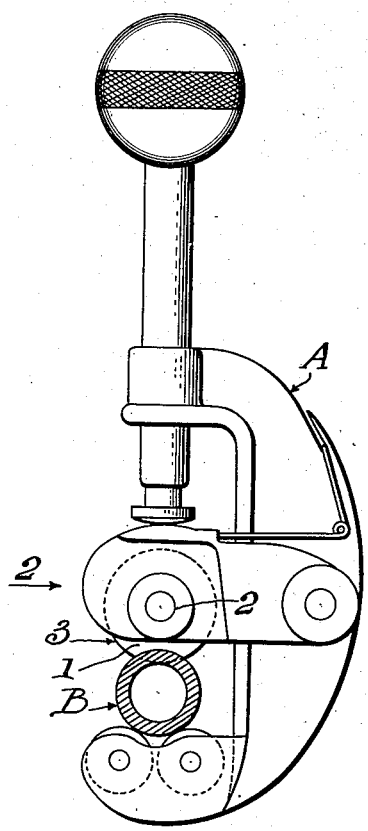
Figure 1 is an end elevation showing a well known type of cutting implement embodying a cutting wheel made in accordance with this invention, and positioned for cutting a piece of tubing.
Figure 2:
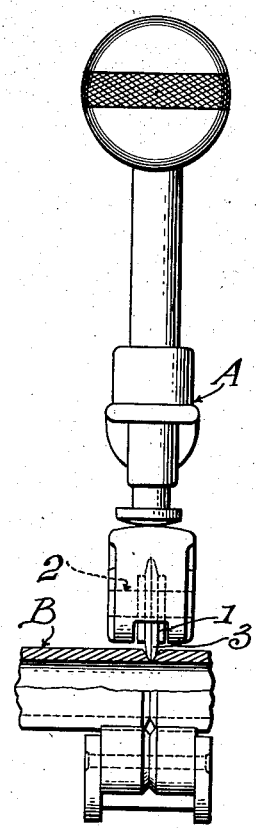
Figure 2 is a view in elevation looking in the direction of the arrow 2 in Figure 1, and showing the tubing in section.

In Figures 1 and 2, a cutting implement of a well known kind is generally designated A and is shown as positioned in the usual manner with reference to a tube B for cutting the latter by rotation of the implement A. The implement A is provided with a cutting roller or wheel 1 journaled as at 2—2 and being thereby adapted to roll upon the tube B and to cut into the tube when the implement A is rotated.

Figure 3:
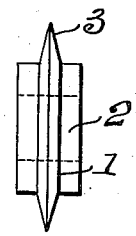
Figure 3 is a view in elevation showing a cutting wheel of one kind which may be made in accordance with the invention.

Figure 3 shows a cutting wheel or roller 2 of one kind which may be made in accordance with the present invention. It is formed with a peripheral V-shaped cutting edge 3. The cutting wheel 2 is blanked generally to the form indicated in Figure 3, and after the preliminary treatment the cutting edge 3 is cold-rolled by working its faces or sides in contact with a hardened die block.

Figure 4:
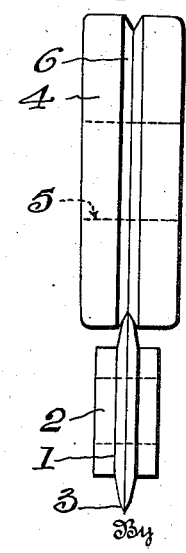
Figure 4 is a diagrammatic view in elevation illustrating the cold rolling of the circular cutting edge in accordance with the invention.
Figure 5:
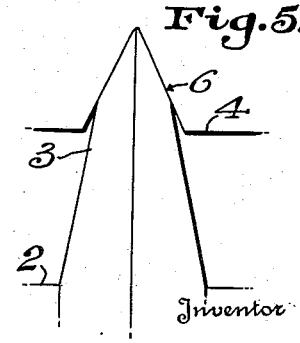
Figure 5 is a diagrammatic view illustrating the contacting of a tool cutting edge with a die block cutting groove.

The illustrative form of die block shown in Figure 4 comprises a hardened circular die block 4 formed with a bore 5 adapting it for mounting for rotation. The die block is formed with a V-shaped working groove 6 shaped to receive the cutting edge 3 of the cutting wheel or roller. Cold working of the wheel cutting edge is effected by rotating the wheel and the die block relatively to each other while maintaining both sides or faces of the cutting edge 3 in pressure contact with the sides or walls of the groove 6, as is clearly shown in the enlarged diagrammatic view, Figure 5.

In practice the hardened die block 4 is formed with a V groove 6 having an included angle slightly greater than the included angle of the cutting edge 3 of the cutting wheel or roller 2. For purposes of illustration, this feature is illustrated in somewhat exaggerated degree in Figures 4 and 5 of the drawing. With the included angles of the cutting edge 3 and the block groove 6 thus related, when the wheel or roller 2 is rolled in the groove 6, the sharp or extreme outer edge of the wheel or roller contacts with the bottom of the groove 6 first, and as the cold rolling progresses, this outer edge portion is compressed and moved backward or inward toward the axis until the included angle of the cutting edge 3 is the same as the included angle of the groove 6. In this manner the actual cutting edge and the metal immediately adjacent to it undergoes and receives the greater part of the packing or cold working.

In the claims:

1. The step in a method of making a cutter wheel from a steel blank having a sharp V-shaped peripheral edge, which consists in radially compacting the metal at said peripheral edge and reducing its diameter by cold rolling said edge under pressure in a die block groove having an included angle greater than the included angle at the peripheral edge of the blank and thereby causing the blank peripheral edge to conform to the angle of said groove.

2. The steps in a method of cold rolling a cutter wheel having a sharp V-shaped periphery, which consists in pressure engaging the V-shaped periphery of said wheel in the bottom of a die block groove of greater included angle than that of said V-shaped periphery, and relatively moving the wheel and die block to bring about rolling contact of the pressure engaging V-shaped periphery in said groove effective to radially compact and reduce the diameter of said V-shaped periphery and cause it to conform to the angel of the die block groove.

3. As an article of manufacture a rotary cutter comprising a steel body having at the periphery thereof a uniformly and radially cold rolled compacted V-shaped cutting edge, the rolling pressure having been applied radially inwardly to the periphery of a V-shaped peripheral edge portion of a body blank and effective to compact and decrease the diameter of said blank and laterally enlarge and shape said edge portion to produce said uniformly and radially compacted V-shaped cutting edge.

ALFRED O. BATES.